(12) United States Patent
Tsai et al.

(10) Patent No.: US 7,715,067 B2
(45) Date of Patent: May 11, 2010

(54) SCANNER CAPABLE OF POSITIONING A SCAN START POSITION AND RELATED METHOD

(75) Inventors: Chen-Tsai Tsai, Hsinchu (TW);
Yan-Mei Chen, Taipei (TW);
Hsueh-Chou Hsu, Kaohsiung (TW)

(73) Assignee: Lite-On Technology Corp., Taipei (TW)

( * ) Notice: Subject to any disclaimer, the term of this patent is extended or adjusted under 35 U.S.C. 154(b) by 283 days.

(21) Appl. No.: 11/872,043

(22) Filed: Oct. 15, 2007

(65) Prior Publication Data

US 2008/0266620 A1    Oct. 30, 2008

(30) Foreign Application Priority Data

Apr. 27, 2007  (TW) .............................. 96114881 A (51) Int. Cl.
*H04N 1/047* (2006.01)
(52) U.S. Cl. ........................ 358/497; 358/474; 358/494; 382/287
(58) Field of Classification Search ................. 358/504, 358/488, 494, 497, 486, 406; 382/287, 286, 382/276
See application file for complete search history.

(56) References Cited

U.S. PATENT DOCUMENTS 5,144,455 A    9/1992  Stein
7,099,054 B2 *  8/2006  Shih et al. ................... 358/474

FOREIGN PATENT DOCUMENTS

TW           462179        11/2001

\* cited by examiner

*Primary Examiner*—Benny Q Tieu
*Assistant Examiner*—Paul F Payer
(74) *Attorney, Agent, or Firm*—Rosenberg, Klein & Lee (57) ABSTRACT

A scanner includes a housing, a transparent platen disposed on the housing for positioning a document, and a calibration pattern formed on a side of the transparent platen. The calibration pattern includes an arc having a first point and a second point. The scanner further includes an optical engine installed inside the housing for scanning the document and the calibration pattern with movement in a first direction, and a control module installed inside the housing for controlling the optical engine to move to a scan start position according to the first point and the second point of the calibration pattern scanned by the optical engine and a radius of curvature of the arc.

25 Claims, 13 Drawing Sheets

SCANNER CAPABLE OF POSITIONING A SCAN START POSITION AND RELATED METHOD

BACKGROUND OF THE INVENTION

1. Field of the Invention

The invention relates to a scanner capable of positioning a scan start position and related method, and more particularly, to a scanner capable of using an arc calibration patter for positioning a scan start position and related method thereof.

2. Description of the Prior Art

Over the last decade, the development of computer peripherals and other electronic apparatus has progressed almost daily. These devices are now utilized universally in daily life. Take the scanner as an example. A scanner is a very popular electronic apparatus for scanning a document and generating corresponding data, or for converting image data, such as photographs, into a digital format that can be operated on and modified with a computer. In addition, the scanner may provide some additional functions such as facsimileing image data through a telephone line, sending image data by e-mail through the Internet, copying image data as a copy machine, or even posting converted image data on the Internet.

Figure 1:
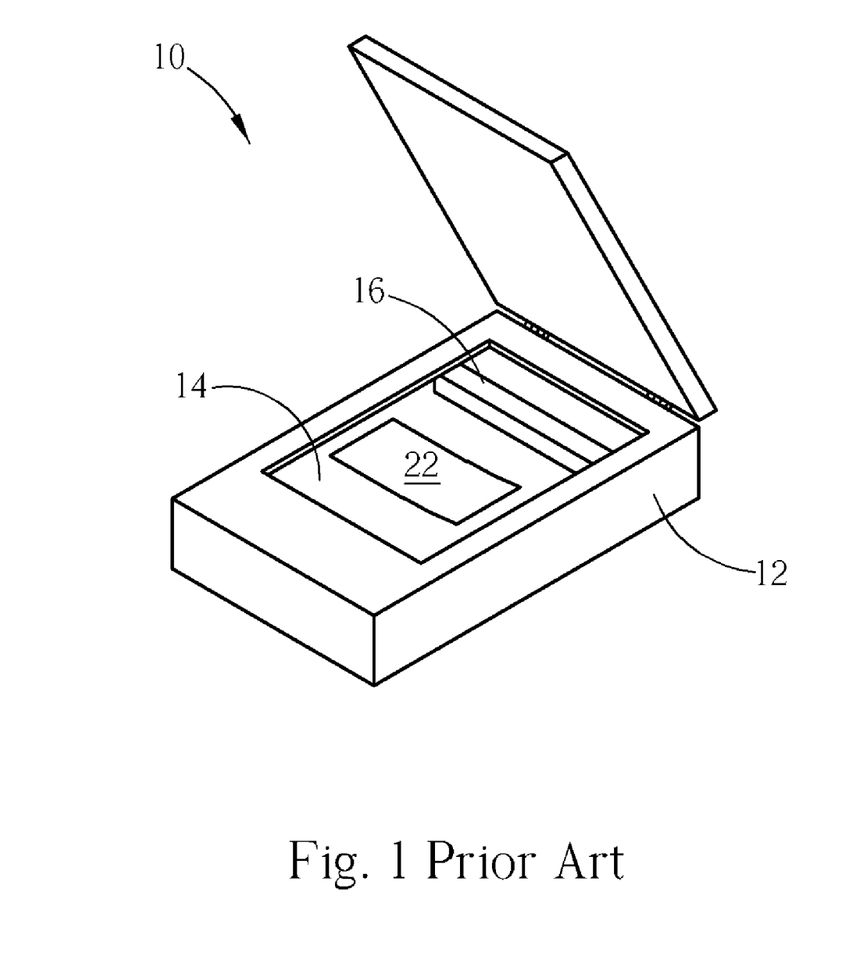
FIG. 1 illustrates a perspective view of a scanner according to the prior art.
Figure 2:
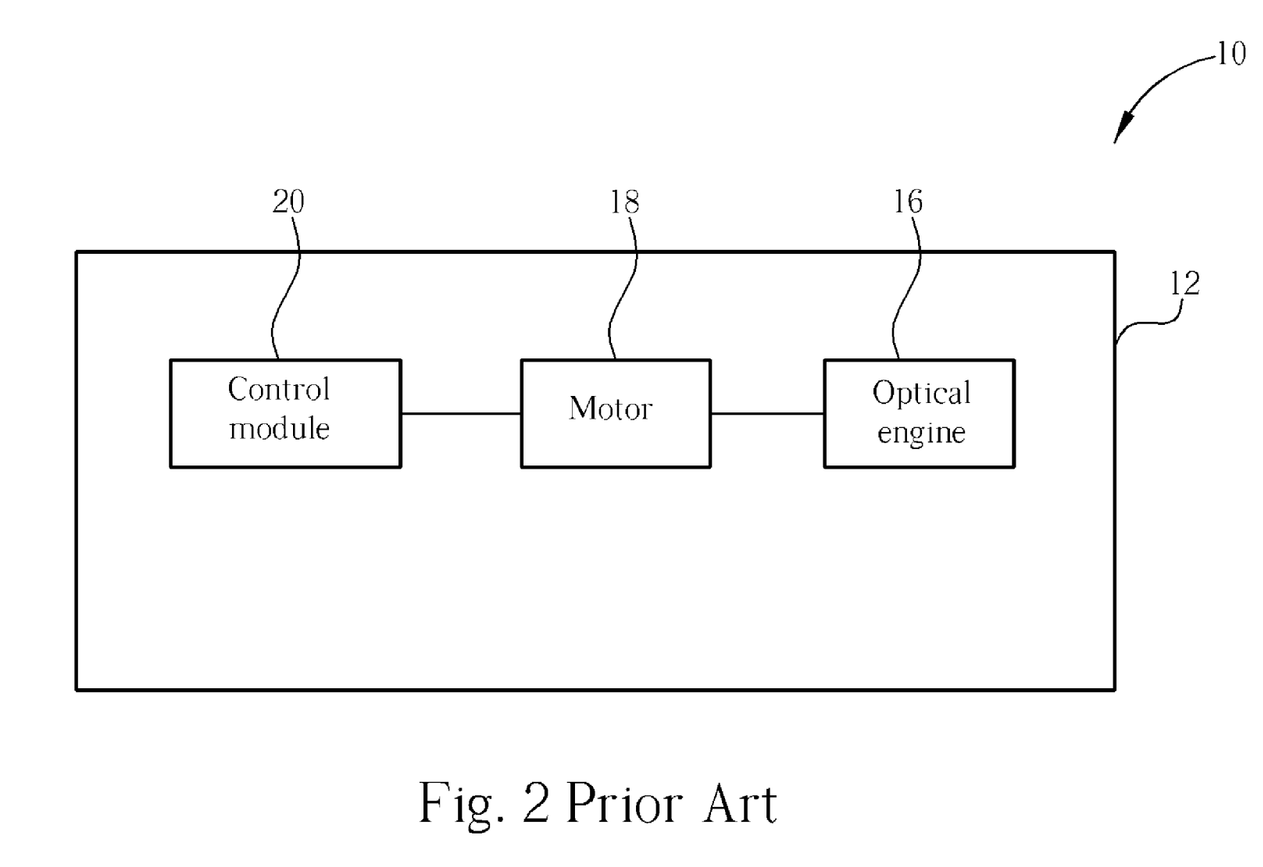
FIG. 2 is a block diagram illustrating the functionality of the scanner according to the prior art.

Referring to FIGS. 1-2, FIG. 1 illustrates a perspective view of a scanner 10 according to the prior art and FIG. 2 is a block diagram illustrating the functionality of the scanner 10. The scanner 10 includes a housing 12, a transparent platen 14, an optical engine 16, a motor 18, and a control module 20. The transparent platen 14 is disposed on the housing 12 for supporting a document 22. The motor is electrically connected to the control module 20 and the optical engine 16. The control module 20 is used to control the motor 18 for moving the optical engine 16 according to a first direction. Preferably, the optical engine 16 is driven in a stepping manner to scan the document 22 and generate image signals corresponding to the document 22. The motor 18 can be a stepping motor, a servomotor, or a DC motor.

Typically, the optical engine 16 is returned to a home position after scanning the document 22 and before the next scan is conducted, the optical engine 16 must be precisely moved from the home position to a scan start position. By precisely moving the optical engine 16 to the scan start position, the user could prevent unwanted portion of the documents from being scanned and that the optical engine 16 could scan all of the required documents, thereby increasing the quality of the scan. The conventional method of scanning documents typically involves forming a reference pattern in the scanner 10 before the scanner 10 and presetting the location of the reference pattern and the scan start position. After the optical engine 16 scans the reference pattern, the control module 20 would control the motor 18 to drive the optical engine 16 to move a few more steps to reach the scan start position and start scanning the documents 22. For instance, U.S. Pat. No. 5,144,455 discloses a means of utilizing a black block as a reference pattern, in which an optical engine would have to move step by step to scan all the lines of the black block for defining a scan start position. The drawback of this method is that a significant amount of time is spent on detecting the scan start position. For instance, if a resolution of 600 dpi is used to scan a block having a width of 2 mm, it would take the motor 18 to drive the optical engine 16 for 47 steps before defining a scan start position.

Taiwan Patent No. 462179 discloses another means of utilizing an isosceles right-angled triangle as a reference pattern. In this example, an optical engine would scan a distance between a side (such as the side adjacent to the 90 degree angle of the isosceles right-angled triangle) and two coordinates on the two other sides of the triangle to determine the scan start position. The drawback of this invention is that if an error occurs during the printing of the reference pattern of the isosceles triangle onto the housing or during the installation of the calibration sheet of the reference pattern, the setting for the isosceles triangle would be incorrect and the distance scanned by the optical engine between the side of the triangle and the two coordinates on other sides would not be the actual distance. As a result, the scan start position could not be positioned accurately. Hence, how to improve the accuracy of the current method for positioning the scan start position for an image scanning device has become a critical task.

SUMMARY OF THE INVENTION

It is an objective of the present invention to provide a scanner of utilizing a calibration pattern having an arc to position the scan start position of an image scanning device and related method thereof.

A scanner is disclosed. The scanner includes a housing, a transparent platen disposed on the housing for positioning a document, and a calibration pattern formed on a side of the transparent platen. The calibration pattern includes an arc having a first point and a second point. The scanner also includes an optical engine installed inside the housing for scanning the document and the calibration pattern according to a first direction, and a control module installed inside the housing for controlling the optical engine to move to a scan start position according to the first point and the second point of the calibration pattern scanned by the optical engine and a radius of curvature of the arc.

A method of scanning a scan start position and positioning a scanner is disclosed. The method includes the following steps: (a) forming a calibration pattern on a side of a transparent platen of the scanner, wherein the calibration pattern comprises an arc having a first point and a second point; (b) moving an optical engine to the scanner along a first direction for scanning the first point and the second point of the calibration pattern; and (c) moving the optical engine to a scan start position according to the first point and the second point of the calibration pattern scanned by the optical engine from step (b) and a radius of curvature of the arc.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
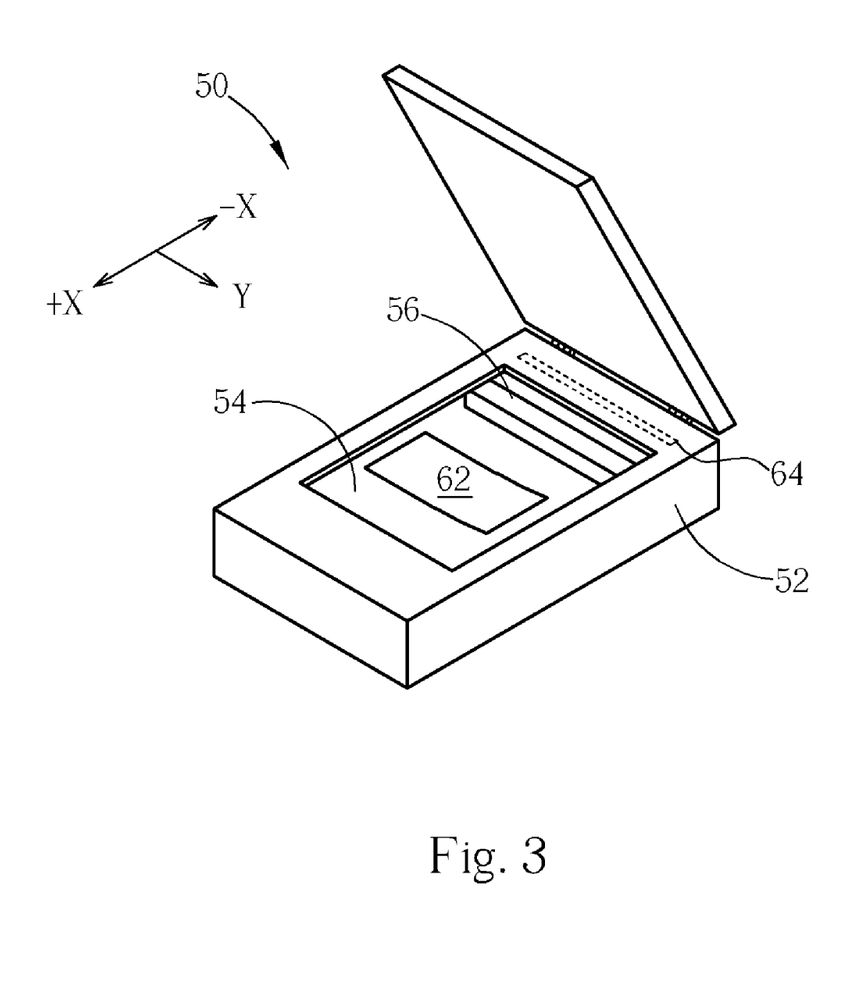
FIG. 3 illustrate a schematic diagram of an image scanning device according to the present invention.
Figure 4:
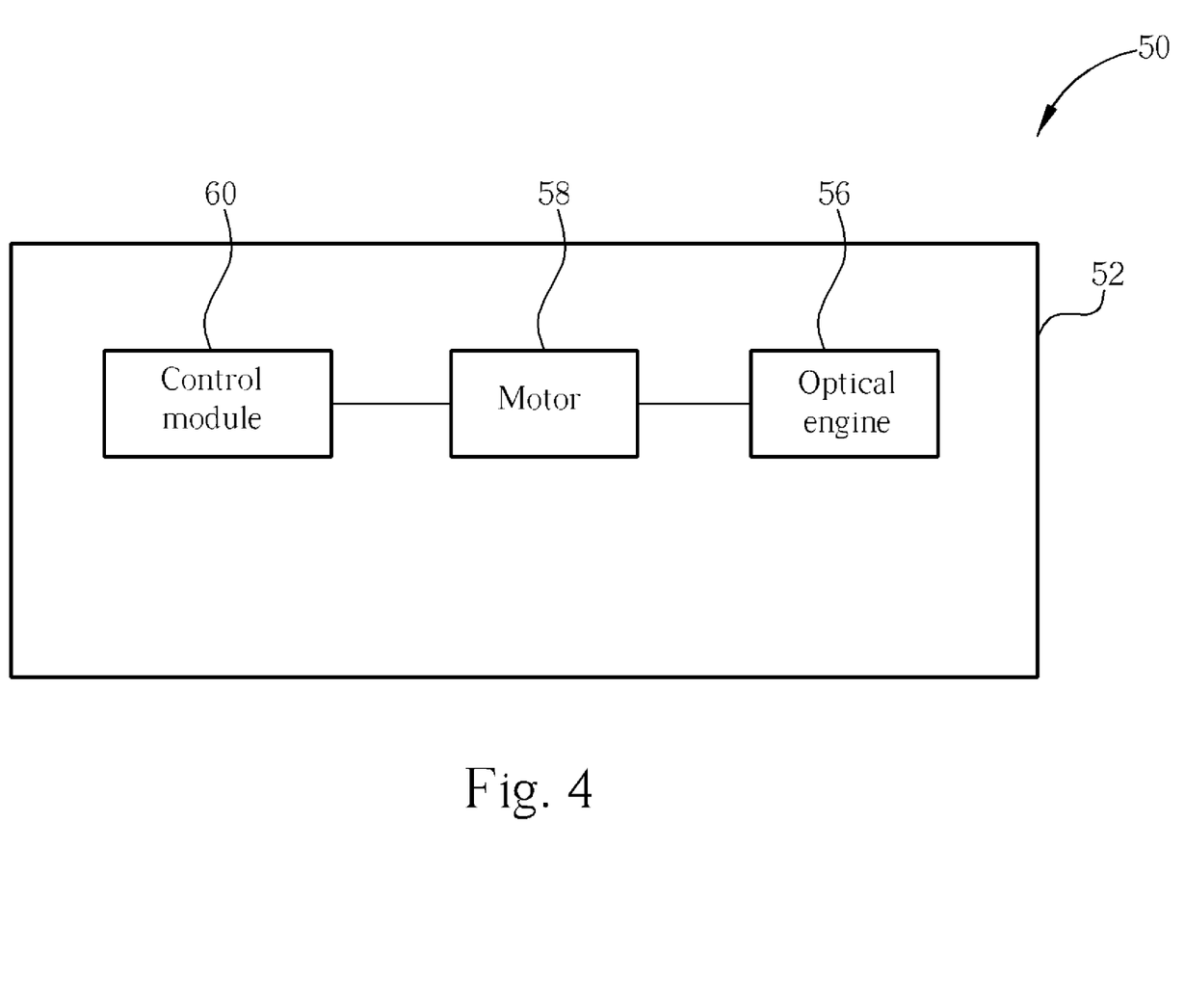
FIG. 4 is a block diagram illustrating the function of the image scanning device of the present invention.

Referring to FIGS. 3-4, FIG. 3 illustrate a schematic diagram of an image scanning device 50 according to the present invention and FIG. 4 is a block diagram illustrating the function of the image scanning device 50. The image scanning device 50 is preferably a scanner, in which the scanner includes a housing 52, a transparent platen 54, an optical engine 56, a motor 58, and a control module 60. The transparent platen 54 is disposed on the housing 52 for supporting a document ready to be scanned. The motor 58 is electrically connected to the control module 60 and the optical engine 56. The control module 60 is used to control the motor 58 for driving the optical engine 56 along a ±X direction. Preferably, the optical engine 56 is driven in a stepping manner to scan the document 62 and generate an image signal corresponding to the document 62. The motor 58 can be a stepping motor, a servomotor, or a DC motor. The image scanning device 50 also includes a calibration sheet 64 installed between the interior of the housing 52 and the transparent platen 54 and on one side of the transparent platen 54.

Figure 5:
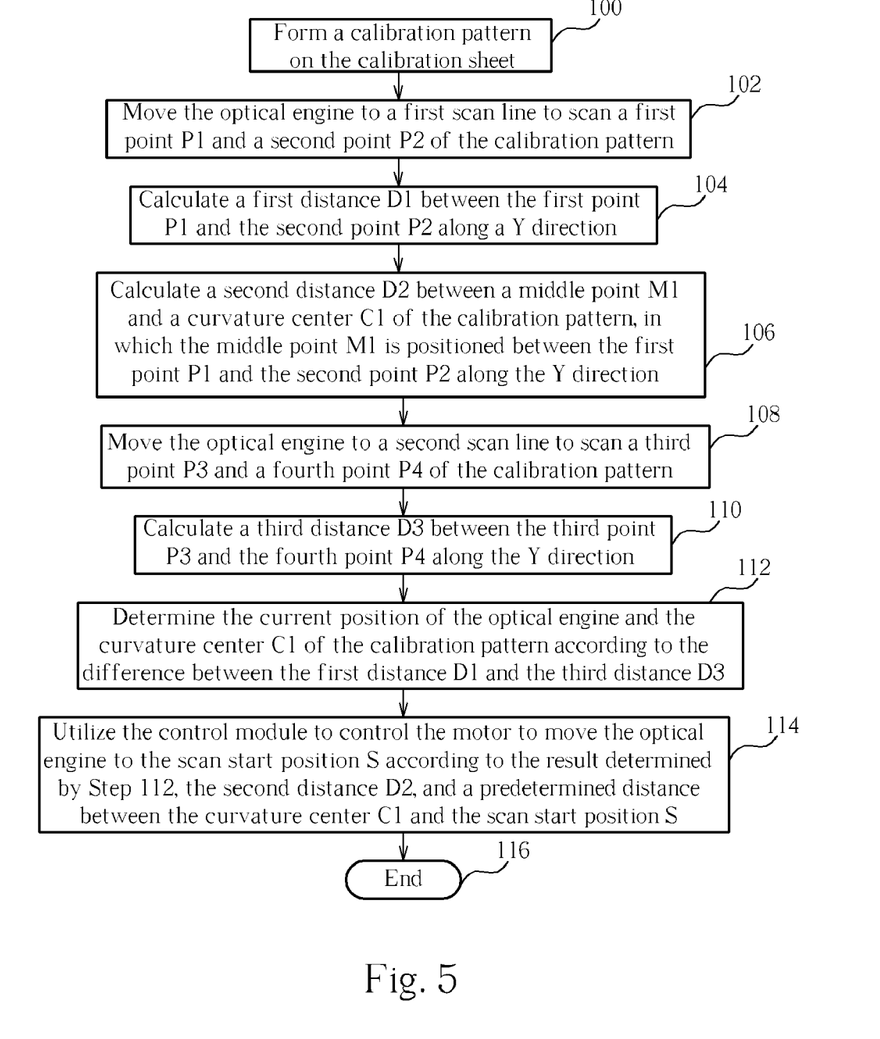
FIG. 5 is a flowchart illustrating the process of positioning a scan start position of the image scanning device according to the first embodiment of the present invention.
Figure 6:
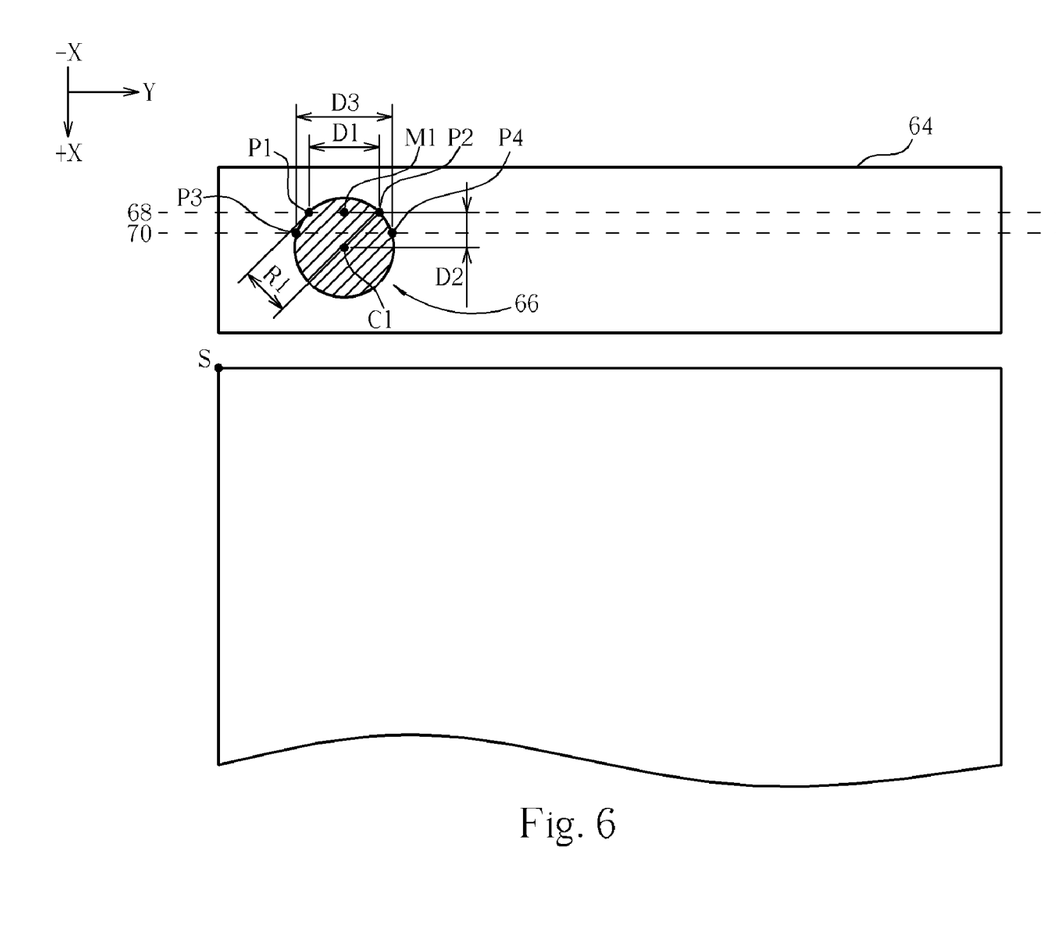
FIG. 6 illustrates the location of the calibration pattern on the calibration sheet and the scan start position S of the image scanning device.

Referring to FIG. 5, FIG. 5 is a flowchart illustrating the process of positioning a scan start position of the image scanning device 50 according to the first embodiment of the present invention. The process include the following steps:

Step 100: Form a calibration pattern 66 on the image scanning device 50, in which the calibration pattern can be formed directly or formed with the calibration sheet 64. Referring to FIG. 6, FIG. 6 illustrates the location of the calibration pattern 66 on the calibration sheet 64 and the scan start position S of the image scanning device 50.

Step 102: Utilize the control module 60 to control the motor 58 to move the optical engine 56 along a ±X direction, such that the optical engine 56 would move to a first scan line 68 to scan a first point P1 and a second point P2 of the calibration pattern 66.

Step 104: Calculate a first distance D1 between the first point P1 and the second point P2 along a Y direction.

Step 106: Calculate a second distance D2 between a middle point M1 and a curvature center C1 of the calibration pattern 66, in which the middle point M1 is positioned between the first point P1 and the second point P2 along the Y direction.

Step 108: Utilize the control module 60 to control the motor 58 to move the optical engine 56 according to a ±X direction, such that the optical engine 56 would move to a second scan line 70 to scan a third point P3 and a fourth point P4 of the calibration pattern 66.

Step 110: Calculate a third distance D3 between the third point P3 and the fourth point P4 along the Y direction.

Step 112: Determine the current position of the optical engine 56 and the corresponding position of the curvature center C1 of the calibration pattern 66 according to the difference between the first distance D1 and the third distance D3.

Step 114: Utilize the control module 60 to control the motor 58 to move the optical engine 56 to the scan start position S according to the result determined by Step 112, the second distance D2, and a predetermined distance between the curvature center C1 and the scan start position S.

Step 116: End

A detail description of the aforementioned steps is provided. First, as shown in FIG. 6, a calibration pattern 66 composed of a solid circle is formed on a calibration sheet 64. Instead of disposing on the calibration sheet 64, the calibration pattern 66 can also be formed directly in the interior of the housing 52. After a scan is completed, the optical engine 56 is returned to a home position and the control module 60 would control the motor 58 to move the optical engine 56 along a ±X direction, such as toward the first scan line 68. The range of the first scan line 68 can be roughly estimated. In other words, as long as the first scan line 68 is disposed within the calibration pattern 66, the optical engine 56 could detect the calibration pattern 66 and scan the first scan line 68 and the first point P1 and the second point P2 of the calibration pattern. After the coordinates of the first point P1 and the second point P2 are obtained, the first distance D1 between the first point P1 and the second point P2 along the Y direction can be calculated. Additionally, as shown below, the second distance D2 between the middle point M1 and the curvature center C1 of the calibration pattern 66 can be calculated according to the Pythagoras Theorem.

$$\text{Second distance } D2 = ((\text{Radius of the curvature } R1 \text{ of the calibration pattern } 66)^2 - (\text{Half of the first distance } D1)^2)^{0.5}$$

After the second distance D2 between the first scan line 68 and the curvature center C1 of the calibration pattern 66 is calculated, the distance between the optical engine 56 and the curvature center C1 of the calibration pattern 66 can be obtained. However, unless the second distance D2 is zero, which represents that the optical engine 56 is positioned relative to the curvature center C1 of the calibration pattern 66, the position of the optical engine 56 being above or below the curvature center C1 would be unknown.

In order to determine the current position of the optical engine 56 and the curvature center C1 of the calibration pattern 66, the control module 60 could control the motor 58 to move the optical engine 56 along a ±X direction, such as toward a +X direction. The optical engine 56 would then move toward the second scan line 70. The distance between the first scan line 68 and the second scan line 70 can be substantially close, such as equal to the width of a typical scan line. The optical engine 56 can also be used to obtain the position of a third point P3 and a fourth point P4, which are located on the perimeter of the calibration pattern 66 and crossed by the second scan line 70. By obtaining the coordinates of the third point P3 and the fourth point P4, the third distance D3 between these two points along the Y direction can be calculated. If the control module 60 controls the motor 58 to drive the optical engine 56 along the +X direction and causing the optical engine 56 to scan from the first scan line 68 to the second scan line 70, a determination is made for the distance between the third distance D3 and the first distance D1. If the third distance D3 is determined to be greater than the first distance D1, it represents that the first scan line 68 and the second scan line 70 are positioned above the curvature center C1 of the calibration pattern 66. However, if the third distance D3 is determined to be less than the first distance D1, it represents that the first scan line 68 and the second scan line 70 are positioned below the curvature center C1 of the calibration pattern 66. Conversely, if the control module 60 controls the motor 58 to drive the optical engine 56 to move along the −X direction and causing the optical engine 56 to move from the first scan line 68 to the second scan line 70, a determination is also made for the distance between the third distance D3 and the first distance D1. If the third distance D3 is determined to be greater than the first distance D1, it represents that the first scan line 68 and the second scan line 70 are positioned below the curvature center C1 of the calibration pattern 66. However, if the third distance D3 is determined to be less than the first distance D1, it represents that the first scan line 68 and the second scan line 70 are positioned above the curvature center C1 of the calibration pattern 66. By calculating the second distance D2 to determined the current position of the optical engine 56 and the curvature center C1 of the calibration pattern 66 and comparing the third distance D3 and the first distance D1 to determine whether the optical engine 56 is above or below the curvature center C1, the present invention could obtain the current position of the optical engine 56 and the corresponding position of the curvature center C1 accordingly.

Preferably, the position of the curvature center C1 of the calibration pattern 66 and the scan start position S can be preset before the fabrication of the image scanning device 50 is completed. In other words, the control module 60 must control the motor 58 to drive the optical engine 56 to move according to a predetermined number of steps so that the optical engine 56 would move from the curvature center C1 to the scan start position S. Since the aforementioned method discloses a means of calculating the second distance D2 between the curvature center C1 of the calibration pattern 66 and the first scan line 68 and the fact that the first scan line 68 is substantially close to the second scan line 70, the second distance D2 would be substantially close to the distance between second scan line 70 and the curvature center C1 of the calibration pattern 66. Alternatively, the distance between the first scan line 68 and the second scan line 70 could be preset before the fabrication of the image scanning device 50 is completed. By obtaining the distance between the second distance D2 and the distance between the first scan line 68 and the second scan line 70, the distance between the second scan line 70 and the curvature center C1 could be determined. According to the result obtained from Step 112, the second distance D1, and the predetermined distance between the curvature center C1 and the scan start position S, the control module 60 could control the motor 58 to drive the optical engine 56 to move to the scan start position S and conduct the next scan.

Figure 7:
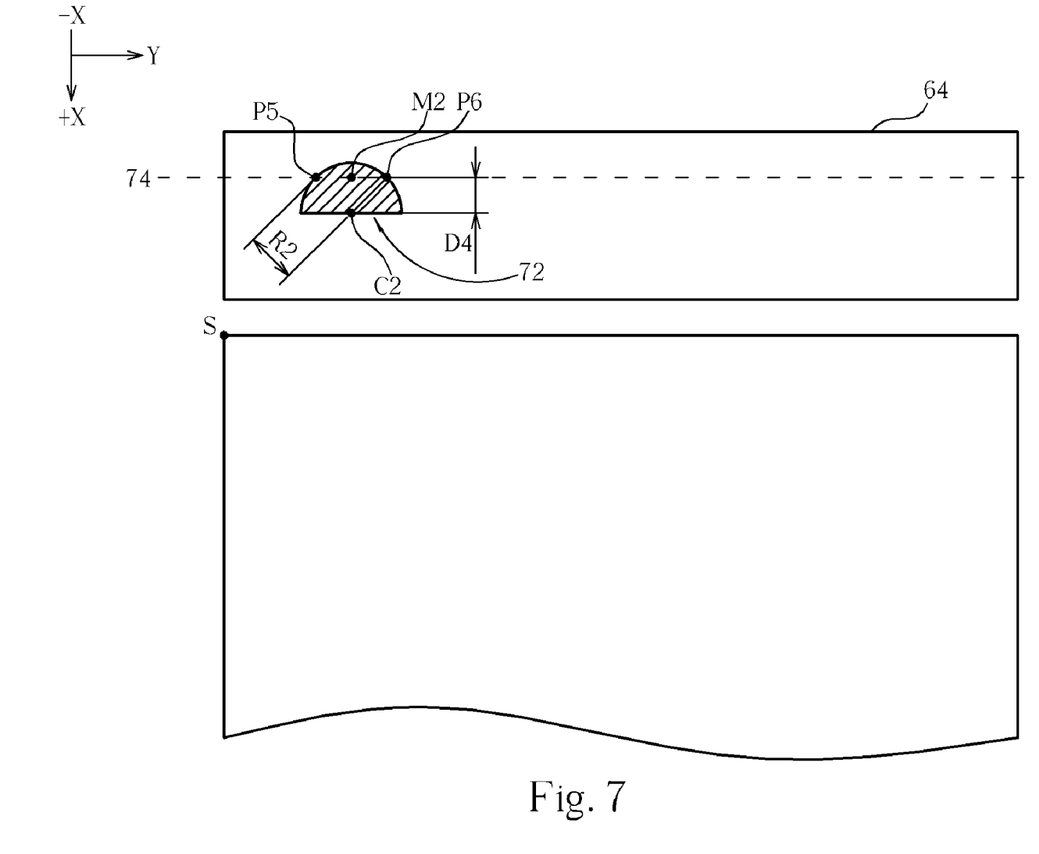
FIG. 7 illustrates a view of a calibration pattern according to the second embodiment of the present invention.
Figure 8:
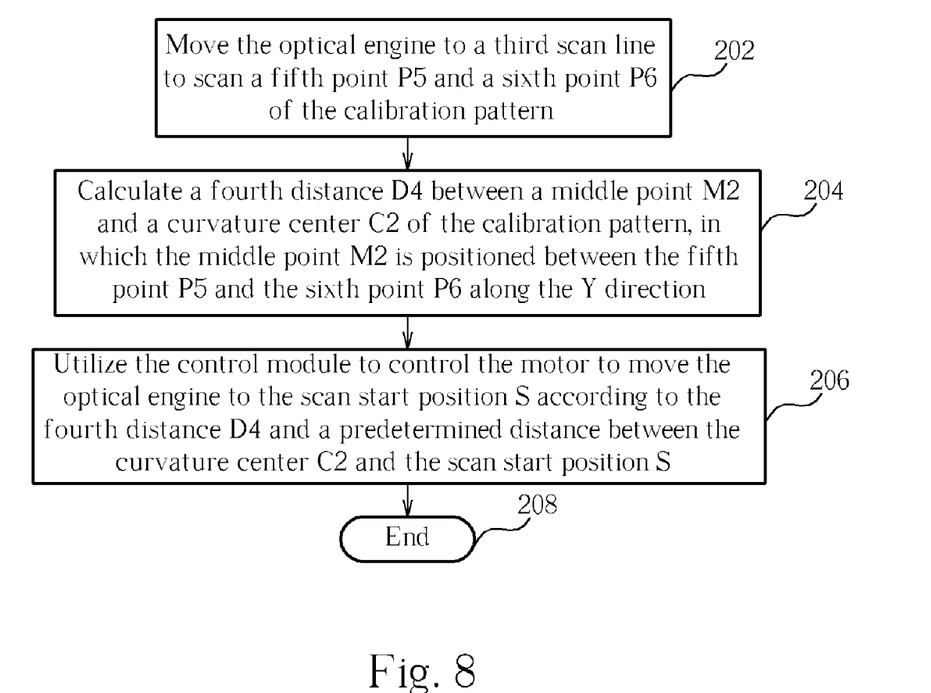
FIG. 8 is a flowchart illustrating the process of positioning a scan start position of the image scanning device according to the second embodiment of the present invention.

Referring to FIG. 7, FIG. 7 illustrates a view of a calibration pattern 72 according to the second embodiment of the present invention. As shown in FIG. 7, the calibration pattern 72 is a solid semicircle. Please also refer to FIG. 8, FIG. 8 is a flowchart illustrating the process of positioning a scan start position of the image scanning device 50 according to the second embodiment of the present invention. The process include the following steps:

Step 202: Utilize the control module 60 to control the motor 58 to drive the optical engine 56 along a ±X direction, such that the optical engine 56 would move to a third scan line 74 to scan a fifth point P5 and a sixth point P6 of the calibration pattern 72.

Step 204: Calculate a fourth distance D4 between a middle point M2 and a curvature center C2 of the calibration pattern 72, in which the middle point M2 is positioned between the fifth point P5 and the sixth point P6 along the Y direction.

Step 206: Utilize the control module 60 to control the motor 58 to drive the optical engine 56 to move to the scan start position S according to the fourth distance D4 and a predetermined distance between the curvature center C2 and the scan start position S.

Step 208: End

In contrast to the first embodiment, the calibration pattern 72 of the second embodiment is a solid semicircle. Hence only one scan is conducted by the optical engine 56 to scan the calibration pattern 72. In other words, the control module 60 is used to control the motor 58 to drive the optical engine 56 along a ±X direction, such that the optical engine 56 would move to the third scan line 74 and scans the fifth point P5 and the sixth point P6 of calibration pattern 72. By obtaining the coordinates of the fifth point P5 and the sixth point P6, the distance between the fifth point P5 and the sixth point P6 along the Y direction can be calculated. Additionally, the fourth distance D4 between the middle point M2 and the curvature center C2 of the calibration pattern 72 can also be calculated by using the Pythagoras Theorem.

Fourth distance $D4=((\text{Radius of the curvature }R2\text{ of the calibration pattern }72)^2-(\text{Half of the distance between the fifth point }P5\text{ and the sixth point }P6\text{ along the }Y\text{ direction})^2)^{0.5}$ By calculating the fourth distance D4 between the third scan line 74 and the curvature center C2 of the calibration pattern 72, the distance between the current position of the optical engine 56 and the curvature center C2 of the calibration pattern 72 can be obtained. Since the calibration pattern 72 is a solid semicircle, different lengths crossed by the third scan line 74 and the calibration pattern 72 at different location are all different. In contrast to the first embodiment, the present embodiment does not have to determine the current position of the optical engine and the calibration pattern as the current position of the optical engine 56 and the corresponding position of the curvature center C2 can be calculated from Step 204. Next, the control module 60 is used to control the motor 58 to drive the optical engine 56 to the scan start position S according to the fourth distance D4 and the predetermined distance between the curvature center C2 and the scan start position S.

Figure 9:
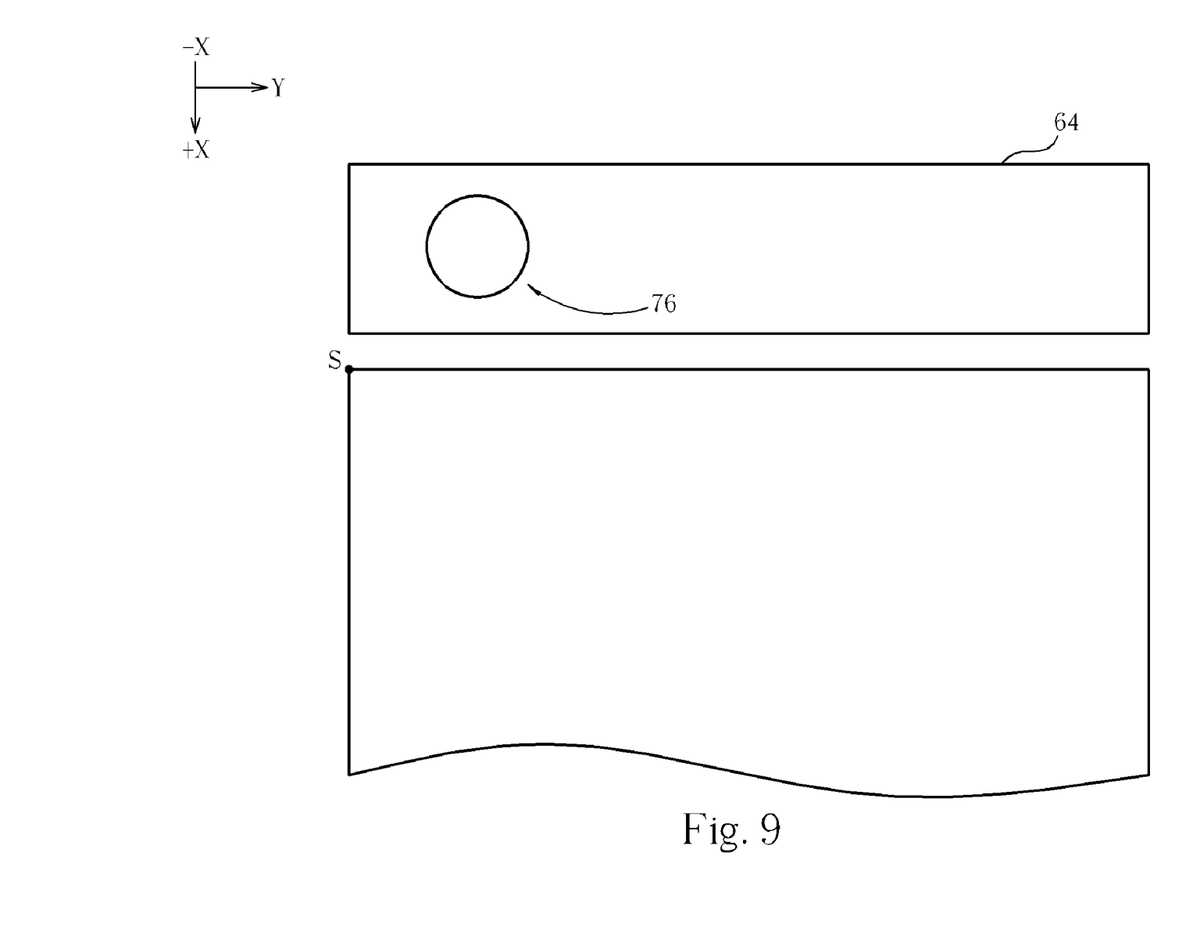
FIG. 9 illustrates a calibration pattern according to the third embodiment of the present invention.
Figure 10:
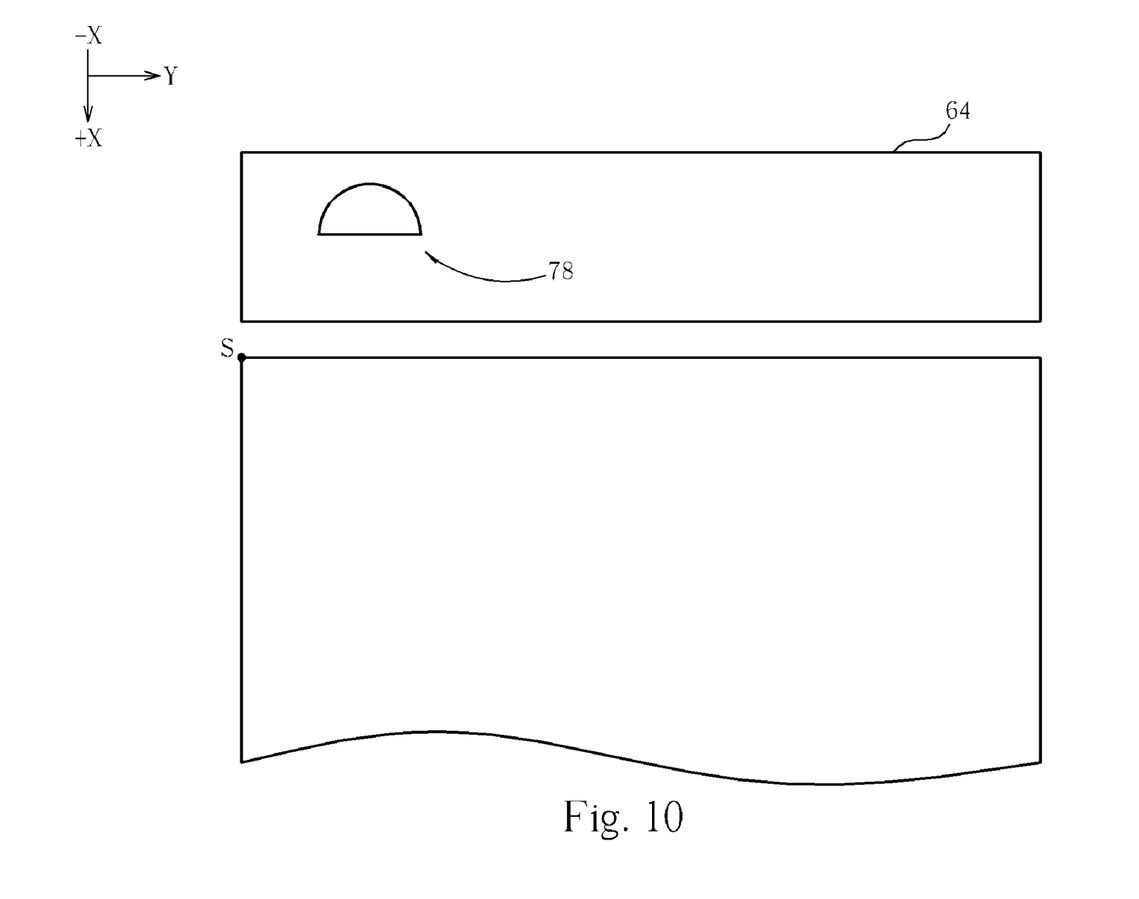
FIG. 10 illustrates a calibration pattern according to the fourth embodiment of the present invention.

Referring to FIG. 9 and FIG. 10, FIG. 9 illustrates a calibration pattern 76 according to the third embodiment of the present invention and FIG. 10 illustrates a calibration pattern 78 according to the fourth embodiment of the present invention. According to the third embodiment, the calibration pattern 76 is a ring shaped pattern, in which the operation of this embodiment is similar to the first embodiment. According to the fourth embodiment, the calibration pattern 78 is a semi-ring pattern, in which the operation of this embodiment is similar to the aforementioned second embodiment.

Figure 11:
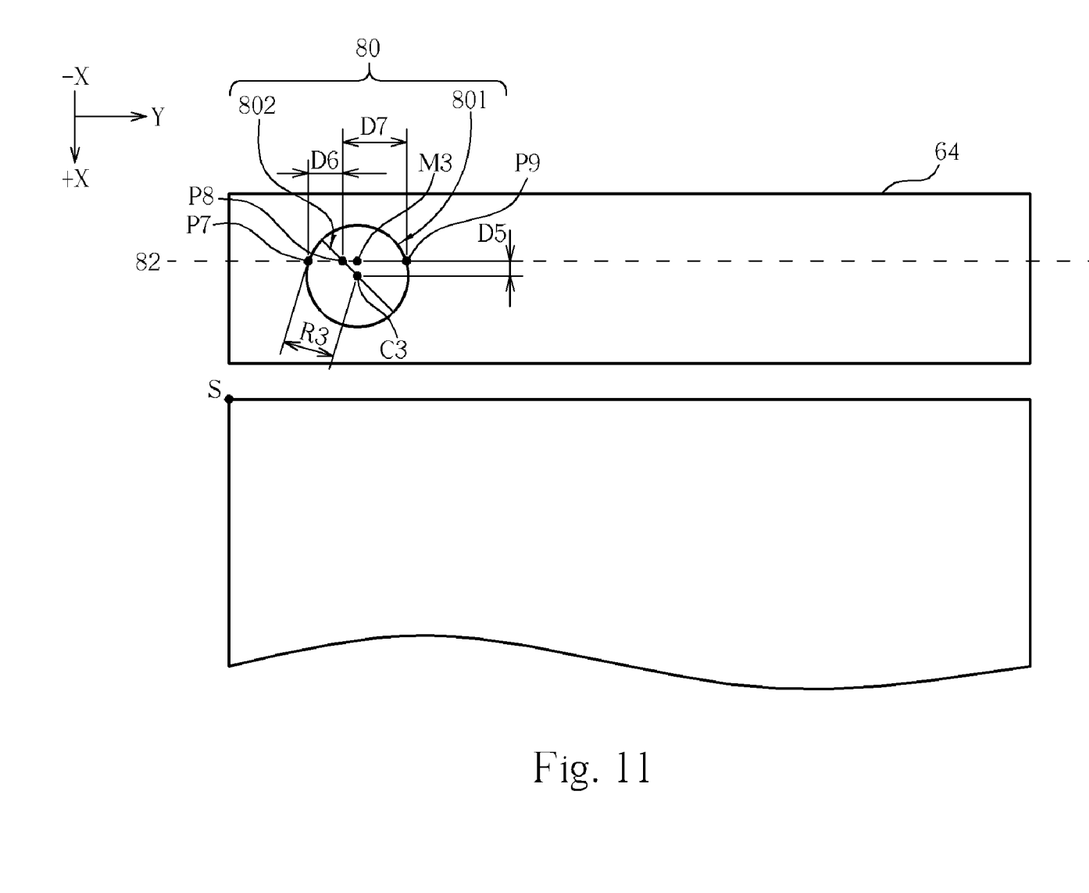
FIG. 11 illustrates a calibration pattern according to the fifth embodiment of the present invention.
Figure 12:
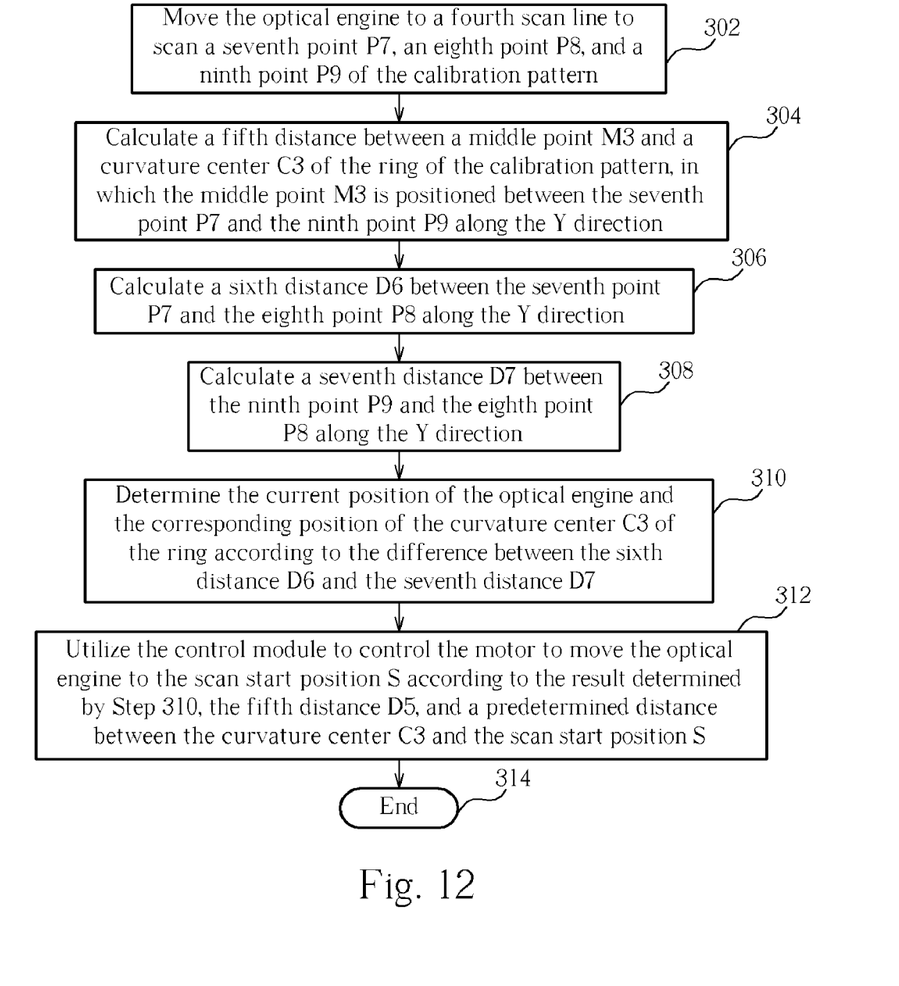
FIG. 12 is a flowchart illustrating the process of positioning a scan start position of the image scanning device according to the fifth embodiment of the present invention.

Referring to FIG. 11, FIG. 11 illustrates a calibration pattern 80 according to the fifth embodiment of the present invention. In this embodiment, the calibration pattern 80 is a combination of a ring 801 and a tangent 802, in which two ends of the tangent 802 are connected to the ring 801. The tangent 802 is also a diameter that passes through a curvature center C3 of the ring 801. Referring to FIG. 12, FIG. 12 is a flowchart illustrating the process of positioning a scan start position of the image scanning device 50 according to the fifth embodiment of the present invention. The process includes the following steps:

Step 302: Utilize the control module 60 to control the motor 58 to drive the optical engine 56 along a ±X direction, such that the optical engine 56 would move to a fourth scan line 82 to scan a seventh point P7, a eighth point P8, and a ninth point P9 of the calibration pattern 80.

Step 304: Calculate a fifth distance between a middle point M3 and a curvature center C3 of the ring 801 of the calibration pattern 80, in which the middle point M3 is positioned between the seventh point P7 and the ninth point P9 along the Y direction.

Step 306: Calculate a sixth distance D6 between the seventh point P7 and the eighth point P8 along the Y direction.

Step 308: Calculate a seventh distance D7 between the ninth point P9 and the eighth point P8 along the Y direction.

Step 310: Determine the current position of the optical engine 56 and the corresponding position of the curvature center C3 of the ring 801 according to the difference between the sixth distance D6 and the seventh distance D7.

Step 312: Utilize the control module 60 to control the motor 58 to drive the optical engine 56 to move to the scan start position S according to the result determined by Step 310, the fifth distance D5, and a predetermined distance between the curvature center C3 and the scan start position S.

Step 314: End

In the fifth embodiment, the optical engine 56 only needs to scan the calibration pattern 80 once. In other words, the control module 60 would control the motor 58 to move the optical engine 56 along the ±X direction and the optical engine 56 would move to the fourth scan line 82 and scans the seventh point P7, the eighth point P8, and the ninth point P9 of the calibration pattern 80. The seventh point P7 and the ninth point P9 are two points located on the edge of the ring 801 and crossed by the fourth scan line 82 and the ring 801, and the eighth point P8 is crossed by the fourth scan line 82 and the tangent 802. By obtaining the coordinates of the seventh point P7 and the ninth point P9, the distance between the seventh point P7 and the ninth point P9 along the Y direction can be calculated. Additionally, the fifth distance D5 between the middle point M3 and the curvature center C3 of the ring 801 can be calculated by using the Pythagoras Theorem.

Fifth distance $D5 = ((\text{Radius of the curvature } R3 \text{ of the ring } 801)^2 - (\text{Half of the distance between the seventh point } P7 \text{ and the ninth point } P9 \text{ along the } Y \text{ direction})^2)^{0.5}$ By calculating the fifth distance D5 between the fourth scan line 82 and the curvature center C3 of the ring 801, the relative distance between the current position of the optical engine 56 and the curvature center C3 of the ring 801 can be obtained. However, unless the distance between the fourth scan line 82 and the fifth distance D5 is zero, which represents that the optical engine 56 is positioned relative to the curvature center C3 of the ring 801, the position of the optical engine 56 being above or below the curvature center C3 would still be unknown.

By obtaining the coordinates of the seventh point P7 and the eighth point P8, the sixth distance between the seventh point P7 and the eighth point P8 along the Y direction can be calculated, and by obtaining the coordinates of the ninth point P9 and the eighth point P8, the seventh distance D7 between the ninth point P9 and the eighth point P8 along the Y direction can be calculated. If the sixth distance D6 is determined to be greater than the seventh distance D7, it represents that the fourth scan line 82 is positioned below the curvature center C3 of the ring 801. Conversely, if the sixth distance D6 is determined to be less than the seventh distance D7, it represents that the fourth scan line 82 is positioned above the curvature center C3 of the ring 801. Preferably, by calculating the fifth distance D5, the relative distance between the current position of the optical engine 56 and the curvature center C3 of the ring 801 can be obtained, and by comparing the sixth distance D6 and the seventh distance D7, the position of the optical engine 56 being above or below the curvature center C3 of the ring 801 can be determined. As a result, the current position of the optical engine 56 and the corresponding position of the curvature center C3 of the ring 801 can be obtained. Thereafter, the control module 60 could use the determined result from Step 310, the fifth distance D5, and the predetermined distance from the curvature center C3 and the scan start position S to control the motor 58 to drive the optical engine 56 to the scan start position S and conduct the next scan. The operation of this embodiment is preferably similar to the aforementioned embodiments.

Figure 13:
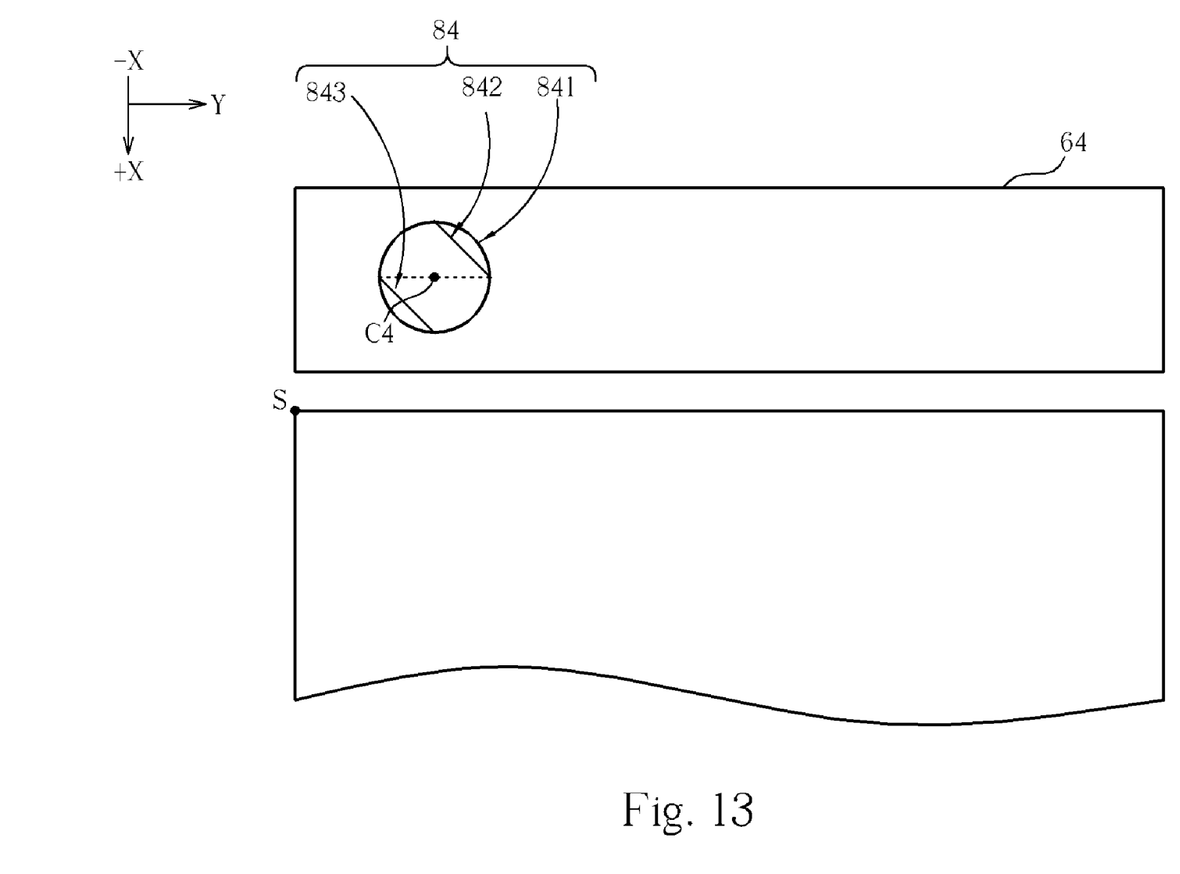
FIG. 13 illustrates a calibration pattern according to the sixth embodiment of the present invention.

Referring to FIG. 13, FIG. 13 illustrates a calibration pattern 84 according to the sixth embodiment of the present invention. The calibration pattern 84 of this embodiment is a combination of a ring 841 and two tangents 842 and 843, in which two ends of the tangents 842 and 843 are connected to the ring 841. By using this design, the present invention could improve the problem of the fourth scan line 82 not being able cross the tangent 802 when the fourth scan line 82 is located outside the cross point of the ring 801 and the tangent 802, such as near either the upper region or the lower region. As a result, the relationship between the current position of the optical engine 56 and the curvature center C4 of the ring 801 could not be determined properly. In other words, the two tangent combination used in this embodiment could ensure that at least one of the tangents 842 and 843 is crossed with a scan line, thereby determining the relationship between the current position of the optical engine 56 and the curvature center C4 of the ring 841.

Overall, the present invention first detects a calibration pattern having an arc and uses this pattern to position the scan start position of an image scanning device. Preferably, the calibration pattern having an arc can be a solid circle pattern, a solid semicircle pattern, a ring pattern, a semi-ring pattern, a combination of ring pattern and tangents, a circular pattern, or other fan-shaped patterns. By using the cross point between the scan line and the edge of the calibration pattern and the radius of curvature of the arc, the relative distance between the current position of the optical engine and the curvature center of the arc can be estimated. Accordingly, the scan start position of the optical engine can be positioned for conducting the next scan.

In contrast to the conventional technique, the present invention specifically uses a calibration pattern having an arc to position the scan start position of an image scanning device. This technique could effectively reduce the overall time and steps spent during the process of positioning the scan start position when the optical engine is driven by the motor. Additionally, since the calibration pattern is a 360 degree symmetrical pattern, the present invention also prevents the problem of producing tolerance when the calibration pattern or calibration sheet is printed or installed in the housing. Specifically, the present invention provides an effective image scanning device capable of positioning a scan start position accurately and related method thereof.

Those skilled in the art will readily observe that numerous modifications and alterations of the device and method may be made while retaining the teachings of the invention.

What is claimed is:

1. A scanner capable of positioning a scan start position, comprising:

a housing;

a transparent platen disposed on the housing for positioning a document;

a calibration pattern disposed on a side of the transparent platen, wherein the calibration pattern comprises a symmetrical arc having a first point and a second point, wherein the arc is a part of the circumference of a circle whose center is defined by said first and second points;

an optical engine installed in the housing for scanning the document and the calibration pattern, wherein the optical engine moves according to a first direction; and a control module installed in the housing for moving the optical engine to a scan start position according to the first point and the second point of the calibration pattern scanned by the optical engine and a radius of curvature of the arc;

whereby the optical engine is displaced a predetermined distance responsive to a position of the center of the circle.

2. The scanner capable of positioning a scan start position of claim 1, wherein the control module calculates a first distance between the first point and the second along a second direction perpendicular to the first direction according to the first point and the second point of the calibration pattern and moves the optical engine to the scan start position according to the first distance and the radius of curvature of the arc.

3. The scanner capable of positioning a scan start position of claim 2, wherein the second distance from a center of the first point and the second point of the calibration pattern along the second direction to a curvature center of the arc is equal to ((radius of the curvature)$^2$–(half of the first distance)$^2$)$^{0.5}$.

4. The scanner capable of positioning a scan start position of claim 3 further comprising a motor for driving the optical engine, wherein the control module controls the motor for moving the optical engine to the scan start position according to the second distance and a predetermined distance from the curvature center to the scan start position.

5. The scanner capable of positioning a scan start position of claim 3, wherein the arc of the calibration pattern comprises a third point and a fourth point, and the control module determines the position of the first point, the second point, the third point, and the fourth point of the calibration pattern, and the curvature center of the arc according to the first point, the second point, the third point, and the fourth point of the calibration pattern scanned by the optical engine and moves the optical engine to the scan start position.

6. The scanner capable of positioning a scan start position of claim 5, wherein the control module determines the position of the first point, the second point, the third point, and the fourth point of the calibration pattern and the curvature center of the arc according to the difference between the first distance and a third distance from the third point and the fourth point along the second direction.

7. The scanner capable of positioning a scan start position of claim 1, wherein the calibration pattern further comprises a secant line having two ends connected to the arc, and the control module utilizes the first point and the second point of the arc and a fifth point crossed by a line connecting the first point and the second point along the second direction and the secant line for determining the corresponding position of the first point, the second point, the fifth point, and the curvature center and moving the optical engine to the scan start position.

8. The scanner capable of positioning a scan start position of claim 7, wherein the control module determines the corresponding position of the first point, the second point, the fifth point, and the curvature center according to the difference between the distance from the first point to the fifth point along the second direction and the distance from the second point to the fifth point along the second direction.

9. The scanner capable of positioning a scan start position of claim 1 further comprising a calibration sheet installed between the interior of the housing and the transparent platen, wherein the calibration pattern is formed on the calibration sheet.

10. The scanner capable of positioning a scan start position of claim 1, wherein the calibration pattern is a solid circle.

11. The scanner capable of positioning a scan start position of claim 1, wherein the calibration pattern is a solid semicircle.

12. The scanner capable of positioning a scan start position of claim 1, wherein the calibration pattern is a ring.

13. The scanner capable of positioning a scan start position of claim 1, wherein the calibration pattern is a semi-ring.

14. A method of scanning a scan start position and positioning a scanner, comprising:

(a) forming a calibration pattern on a side of a transparent platen of the scanner, wherein the calibration pattern comprises a symmetrical arc having a first point and a second point, wherein the arc is a part of the circumference of a circle whose center is defined by said first and second points;

(b) moving an optical engine of the scanner along a first direction for scanning the first point and the second point of the calibration pattern; and (c) moving the optical engine to a scan start position according to the first point and the second point of calibration pattern scanned by the optical engine from step (b) and a radius of curvature of the arc;

whereby the optical engine is displaced a predetermined distance responsive to a position of the center of the circle.

15. The method of claim 14, wherein the steps (c) comprises calculating a first distance between the first point and the second point along a second direction perpendicular to the first direction according to the first point and the second point scanned by step (b) and moving the optical engine to the scan start position according to the first distance and the radius of curvature of the arc.

16. The method of claim 15, wherein the second distance from a middle point of the first point and the second point of the calibration pattern along the second direction to a curvature center of the arc is equal to ((Radius of the curvature)$^2$–(half of the first distance)$^2$)$^{0.5}$.

17. The method of claim 16, wherein the step (c) comprises controlling the motor to move the optical engine to the scan start position according to the second distance and a predetermined distance from the curvature center to the scan start position.

18. The method of claim 16 further comprising utilizing the optical engine to scan a third point and a fourth point of the calibration pattern, wherein the step (c) comprises determining the position of the first point, the second point, the third point, and the fourth point of the calibration pattern, and the curvature center of the arc according to the first point, the second point, the third point, and the fourth point of the calibration pattern scanned by the optical engine and moving the optical engine to the scan start position.

19. The method of claim 18, wherein the step (c) comprises determining the position of the first point, the second point, the third point, and the fourth point of the calibration pattern and the curvature center of the arc according to the difference between the first distance and a third distance from the third point and the fourth point along the second direction.

20. The method of claim 14 further comprising utilizing the optical engine to scan a fifth point of a secant line of the calibration pattern, the fifth point being the cross point of the connection between the first point and the second point along the second direction and the secant line, wherein the step (c)

comprises determining the position of the first point, the second point, the fifth point and the curvature center according to the first point and the second point of the arc and the fifth point of the secant line scanned by the optical engine and moving the optical engine to the scan start position.

21. The method of claim 20, wherein the step (c) comprises determining the position of the first point, the second point, the firth point, and the curvature center according to the difference between the distance from the first point to the fifth point along the second direction and the distance from the second point to the fifth point along the second direction.

22. The method of claim 14, wherein the calibration pattern is a solid circle.

23. The method of claim 14, wherein the calibration pattern is a solid semicircle.

24. The method of claim 14, wherein the calibration pattern is a ring.

25. The method of claim 14, wherein the calibration pattern is a semi-ring.

* * * * *